United States Patent Office 3,008,641
Patented Nov. 14, 1961

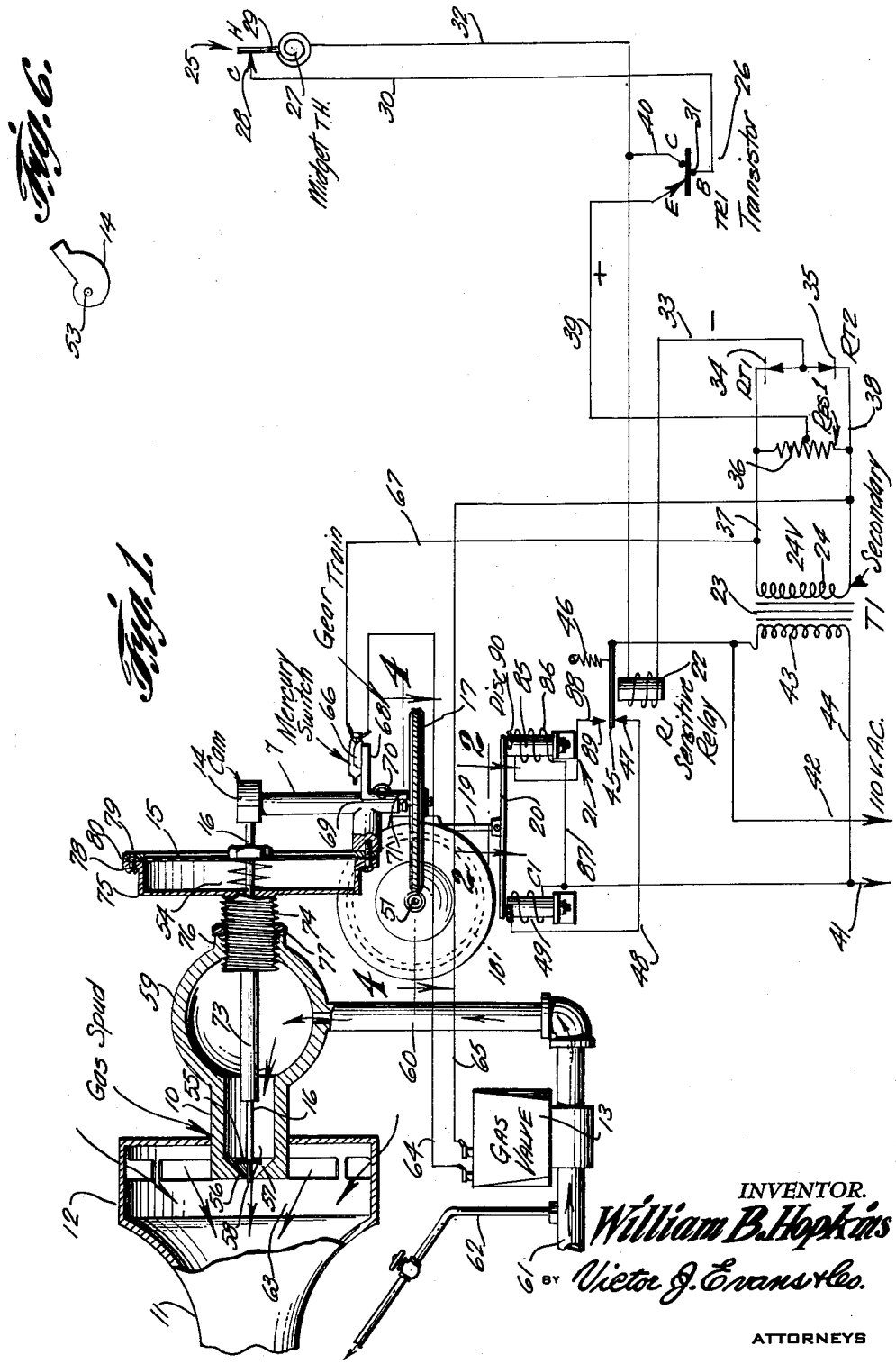

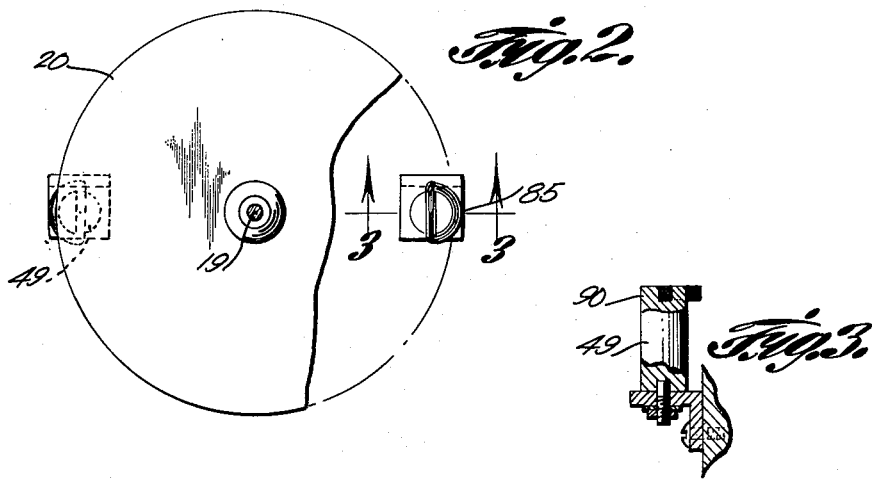
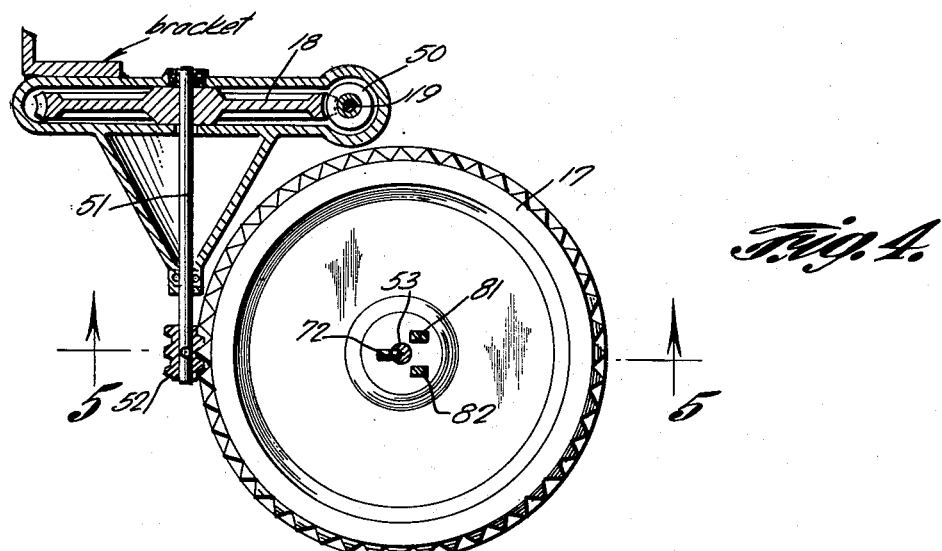
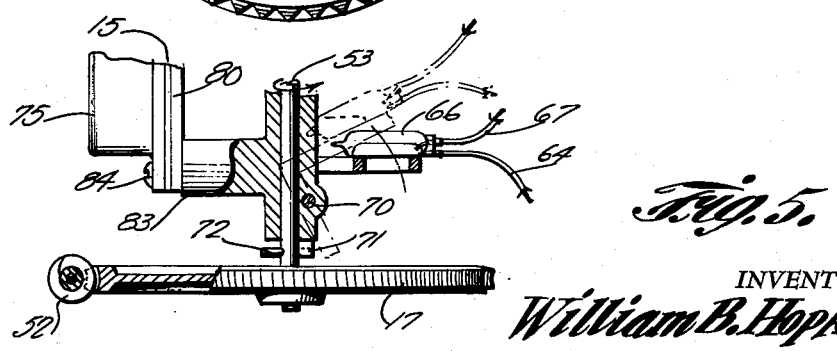

3,008,641
FLUID FLOW SYSTEM
William B. Hopkins, 600 Park Ave., Muscatine, Iowa
Filed Aug. 5, 1959, Ser. No. 831,848
3 Claims. (Cl. 236—1)

This invention relates to a fluid flow system such as used for controlling the flow of fuel to a gas or liquid burner, and in particular a fluid flow system using a midget thermostat in combination with a transistor and a mercury switch in which the fuel control valve is positioned at the orifice of the spud instead of in the gas line thereby enabling the gas velocity to be maintained at the necessary amount making a blue flame down to the smallest size possible.

The purpose of this invention is to provide a fluid flow system having a shaded pole motor in which a disc of the motor is continuously on the move, either up or down, thereby constantly anticipating the need for a change of the firing rate.

Various types of feeding mechanisms have been provided for fluid flow and particularly for supplying fuel to gas and oil burners. However, in conventional fluid flow systems pumping mechanisms are required and such systems are not capable of delicate adjustments, such as are required in balanced type systems.

With this throught in mind this invention contemplates a fluid flow system wherein the immediate reversal of an induction driven disc is possible, due to the shift of a relay which allows the disc to have an inherent heat anticipation feature.

The object of this invention is, therefore, to provide a fluid flow system wherein gas flow is regulated at the orifice of the spud instead of in a gas feed line extended from the spud.

Another object of the invention is to provide a fluid flow system in which a disc of a shaded pole motor is continuously moving and thereby constantly anticipating the requirement for a change in the supply of fuel.

Another important object of the invention is to provide a fluid flow system in which the system is readily adjusted to particular heat loss characteristics of a building being heated, such adjustment being made only at the time of installation or as soon as the heat loss pattern is ascertained.

A further object of the invention is to provide a fluid flow system which is operated by a motor in which the motor revolves in one direction with the contact closed and in the opposite direction with the contact open to an infinitesimal degree whereby contact arcing to destroy accuracy is obviated.

A still further object of the invention is to provide an improved fluid flow system particularly adapted for regulating the supply of fuel to gas and oil burners in which the system is of a comparatively simple and economical construction.

With these and other objects and advantages in view the invention embodies a fluid flow system in which a fluid control valve is positioned in the end of a spud which is directly connected to a gas valve and in which the fluid control valve is controlled by a very sensitive or midget thermostat in combination with a transistor, relay, a shaded pole motor and a transformer, the secondary winding of the transformer providing low voltage current for the thermostat, transistor, and relay. A mercury switch controls the gas valve; keeping it either open or closed and thereby provides low flame cutoff.

Other features and advantages of the invention will appear from the following description taken in connection with the drawing, wherein:

FIGURE 1 is a diagrammatic view illustrating the arrangement of the essential elements of the fluid flow system.

FIGURE 2 is a sectional plan taken on line 2—2 of FIGURE 1 with the parts shown on an enlarged scale showing the disc of the shaded pole motor.

FIGURE 3 is a section taken on line 3—3 of FIGURE 2 showing the mounting of one of the poles of the shaded pole motor.

FIGURE 4 is a sectional plan taken on line 4—4 of FIGURE 1, with the parts shown on an enlarged scale showing a worm gear assembly for adjusting the fuel supply valve in the end of the spud.

FIGURE 5 is a cross-sectional taken substantially on line 5—5 of FIGURE 4 with parts shown in elevation showing the mercury switch assembly.

FIGURE 6 is a plan view of the cam for actuating the fuel supply valve.

Referring now to the drawing wherein like reference characters denote corresponding parts the improved fluid flow system of this invention includes a fuel supply spud 10 positioned to discharge into a venturi section 11 of a burner housing 12, a fuel control valve 13, a cam 14, a diaphragm 15 providing a seal around the valve stem 16, a worm gear 17 for actuating the cam 14, a worm gear 18 actuated by a shaft 19 of a disc 20 of a shaded pole motor 21, a relay 22 for controlling the circuit to the motor 21, a transformer 23 having a secondary winding 24 that supplies low voltage current to a thermostat 25, and a transistor 26, controlled by the thermostat, and which amplifies the current to a value so that it can operate the sensitive relay 22.

The midget thermostat includes a sensitive bi-metal spiral 27, the contacts of which are a noble metal, such as gold. The thermostat includes a stationary contact 28 and a movable contact 29 that is actuated by the spiral 27 and, as shown in FIGURE 1 the contact 28 is connected by a wire 30 to a terminal 31 of the transistor 26 and the spiral 27 is connected by a wire 32 to one terminal of the sensitive relay 22, the opposite terminal of which is connected by a wire 33 to rectifiers 34 and 35 which, in conjunction with resistor 36 make full wave rectification, of the low voltage A.C. current possible. The rectifiers and resistor are connected to opposite terminals of the secondary 24 by wires 37 and 38 and the resistor is connected by wire 39 to the transistor 26, the opposite terminal of which is connected by wire 40 to the wire 32 extended from the spiral of the thermostat.

110 v. A.C. current is supplied to the system through wires 41 and 42, the wire 42 being connected to one end of the primary 43 of the transformer and the wire 41 being connected to the opposite end of the primary by a wire 44.

The wires 32 and 33 are connected to opposite terminals of the coil of the sensitive relay 22, RI, wherein the armature 45, that is normally urged upwardly by tension spring 46, engages contact 47 completing a circuit through wire 48 to pole 49 of the shaded pole motor 21 whereby the disc 20 rotates by induction so as to cause the worm 50 on the shaft 19 to rotate the worm gear 18 on the shaft 51, thereby rotating worm 52 and turning the worm gear 17 which turns the cam 14 through shaft 53 in a bearing casing 7. By this means the cam 14 is actuated in a counter-clock-wise direction permitting spring 54 to withdraw the valve disc 55, through the stem 16 and, consequently, increasing the open area between the periphery of the disc 55 and valve seat 56. The valve seat 56 terminates in an orifice 57 through which fuel passes to the burner housing and the orifice is restricted by a pin 58 extended from the valve stem 16 on which the disc 55 is carried.

The spud 10 is provided with a closed chamber 59 that is connected by a pipe 60 to the fuel supply valve 13 and the valve is provided with a fuel supply connection 61. A tube 62 extends from the gas supply line to a pilot positioned near the burner end.

The gas or other fuel supply valve 13 is controlled by electric current through wires 64 and 65, the wire 65 extending directly to one side of the secondary 24 to the wire 38, and the wire 64 being connected to one terminal of a mercury switch 66, the opposite terminal of which is connected by wire 67 to the opposite side of the secondary 24 by the wire 37.

The mercury switch 66 is mounted on a horizontally disposed arm 68 of an L-shaped bracket 69 that is pivotally mounted on the bearing casing 7, by a pin 70, as shown in FIGURES 1 and 5, and a vertical leg 71 of the lever is positioned to be engaged by a pin 72 on the lower end of the cam shaft 53 whereby the lever is actuated from the position shown in full lines in FIGURE 5 to the position shown in dotted lines whereby a circuit completed by connecting terminals of the mercury switch to the wires 64 and 67 is broken when the lever 69 is actuated to the dotted line position by the pin 72.

The stem 16 of the fuel control valve is supported by a sleeve 73 in a threaded stud 74 that extends from the base of a housing 75 of the diaphragm 15 and the stud 74 is threaded in a hub 76 of the spud casing in which the stud is locked in adjusted position by a lock nut 77. The housing 75 is provided with a flange 78 upon which the diaphragm 15 is secured by screws 79 which extend through a ring 80.

Movement of the pin 72 on the lower end of the shaft 53 of the cam 14 is restricted by stops 81 and 82 which extend downwardly from the lower end of the cam shaft bearing casing 7. The casing 7 is also provided with an arm 83 upon which the housing 75 is mounted by screw 84.

In addition to the pole 49 the shaded pole motor 21 is also provided with a pole 85 that is energized by a coil 86, one side of which is connected by a wire 87 to the wire 41 that is connected to one side of the coil of the pole 49, and the opposite end of which is connected by a wire 88 to the terminal 89 that is positioned to be engaged by the armature 45 when the outside temperature rises to such a degree that less heat is required, in which case the direction or rotation of the disc 20 is reversed. In this movement the circuit to the pole 49 is broken as the armature 45 leaves terminal 47 and contacts terminal 89.

With the parts assembled as illustrated and described the gas flow of the fluid flow system of this invention is regulated at the orifice of the spud instead of at a point in the gas line, enabling the gas velocity to be maintained at the necessary amount and making a blue flame possible down to the smallest size.

The disc of the shaded pole motor is continuously moving, either up or down, thereby providing means for constantly anticipating the need for change of the firing rate.

The speed of the shaded pole motor, both upwardly and downwardly of the scale of adjustment, is adjustable by turning the poles slightly one way or the other, thereby providing means for adjusting the system to the particular heat loss characteristics of the building being heated. This adjustment is made only at the time of installation or as soon as the heat loss pattern is ascertained.

The thermostat system operates on the closest differential possible. When the contacts are closed the shaded pole motor is revolving in one direction and when the contacts are open, even to just an infinitesimal degree of separation, the motor revolves in the opposite direction. Contact arcing which destroys the accuracy is eliminated as the relay is transistor actuated. This makes it possible for only a very small current, at a low voltage, to be closed by the thermostat contact. The thermostat spiral is small and all parts surrounding the spiral are of low heat retention characteristics. This enables quick response.

The small current carrying ability of the midget thermostat is not sufficient to be directly utilized to control the system. Instead, the contacts of the thermostat control a transistor which, in turn, amplifies the current to a value which can operate sensitive relay 22. Furthermore the fuel supplied to the burner is turned off by a mercury switch which is tilted back at the low end of travel of the valve operating mechanism thereby making the double contact type of thermostat unnecessary.

*Operation*

With the outside temperature warm no heat from a furnace to which fuel is supplied by this system is required. In such case the pilot light of the furnace only is burning. It is impossible to turn down the fuel control to such a position that the pilot light is not required.

Upon dropping of the outside temperature, in which case heat is required the midget thermostat that is connected to the sensitive relay 22 by wire 32 closes the circuit to sensitive relay 22 pulling the armature 45 downwardly to engage contact 47 and closing the circuit through the wire 48 to the pole 49 of the shaded pole motor thereby starting the disc 20 to rotate, and the disc, operating through the worm gear assembly, turns the cam 14 in a counterclock-wise direction permitting the spring 54 to draw the valve disc 55 outwardly opening the orifice of the valve. At the same time the circuit is completed to the control valve 13 through wires 64 and 65 that are connected to the secondary 24 and mercury switch 66 thus admitting a small quantity of fuel to the burner.

Should the temperature continue to drop this movement continues with the movement of the cam 14 continuing and, thereby, increasing the opening of the valve formed by the disc 55 and valve seat 56.

However, should the outside temperature rise the thermostat will open and, operating through the transistor which is connected to the thermostat through wire 30 and to the wire 32 that connects the midget thermostat to the relay 22, the relay 22 will be deenergized permitting the spring 46 to draw the armature 45 upwardly to contact the terminal 89, compleing a circuit to the pole 85 through wire 88 and breaking the circuit to the pole 49; whereby the disc 20 rotates in the opposite direction causing the cam 14 to rotate in a clock-wise direction whereby the orifice 58 of the spud will gradually close. The function of the transistor is that of a protective device for the midget thermostat in that only a very small current has to be controlled by the midget thermostat itself since the system will turn off the low flame at the lowest end of travel of the system and then relight the low flame upon the operation of the system.

By this means the disc 20 will be moving continuously, compensating for varying temperatures and abrupt stopping and starting of the fire of the furnace is obviated.

When a constant type of weather prevails and heat is required, the system seeks the correct firing rate and then holds it by continued reversals of the induction driven disc 20; the reversals lasting but a short time in either direction and the flame not noticeably changing. Should the temperature outside rise or fall, the system centers about still another position and then holds the new firing rate by continued reversals as before.

It will be understood that modifications, within the scope of the appended claims, may be made in the design and arrangement of the parts without departing from the spirit of the invention.

What is claimed is:

1. In a fluid flow system, the combination which comprises a burner housing, a spud having a fuel supply connection extended therefrom and having an orifice positioned to discharge into the burner housing, a valve element positioned to co-act with the orifice for increasing and reducing the quantity of fuel supplied to the orifice, a cam for actuating the valve element in the direction of reducing the area at the orifice, a worm gear assembly for turning the cam, a shaded pole motor having a disc operatively connected to the worm gear assembly for actuating the gears to rotate the cam, a relay positioned to be alternately connected to poles of the shaded pole motor for causing the disc to rotate in clock-wise and counter-clock-wise directions, a thermostat, a transistor, a circuit connecting the thermostat and transistor to the relay, and a transformer connected in the circuit for providing low voltage current to the thermostat, transistor and relay.

2. In a fluid flow system, the combination which comprises a burner housing, a spud having a fuel supply connection extended therefrom and having an orifice positioned to discharge into the burner housing, a valve element positioned to co-act with the orifice for increasing and reducing the quantity of fuel supplied to the orifice, a cam for actuating the valve element in the direction of reducing the area at the orifice, a worm gear assembly for turning the cam, a shaded pole motor having a disc operatively connected to the worm gear assembly, said disc being actuated by induction, a relay positioned to be alternately connected to poles of the shaded pole motor for causing the disc to rotate in clock-wise and counter-clock-wise directions, a thermostat, a transistor, a circuit connecting the thermostat and transistor to the relay, a transformer connected in the circuit for providing low voltage current to the thermostat, transistor and relay.

3. In a fluid flow system, the combination which compries a burner housing, a spud having a fuel supply connection extended therefrom and having an orifice positioned to discharge into the burner housing, a valve element positioned to co-act with the orifice for increasing and reducing the quantity of fuel supplied to the orifice, a cam for actuating the valve element in the direction of reducing the area at the orifice, a worm gear assembly for turning the cam, a shaded pole motor having a disc operatively connected to the worm gear assembly said disc being actuated by induction, a relay positioned to be alternately connected to poles of the shaded pole motor for causing the disc to rotate in clock-wise and counter-clock-wise directions, a midget thermostat, a transistor, a circuit connecting the thermostat and transistor to the relay, a transformer connected in the circuit for providing low voltage current to the thermostat, transistor, and relay, a mercury switch positioned to be actuated by the rotation of said cam, a gas valve adapted to be actuated by said mercury switch, and a circuit connecting the mercury switch and gas valve to the transformer so that as the mercury switch is actuated by the direction of rotation of the cam to reduce the area at the orifice the continuity of the circuit connecting the mercury switch and gas valve will be broken to cut off the supply of fuel to the burner housing to provide a low flame cut-off.

References Cited in the file of this patent
UNITED STATES PATENTS

| | | |
|---|---|---|
| 1,725,678 | Stein | Aug. 20, 1929 |
| 1,973,765 | Hunt | Sept. 18, 1934 |
| 2,103,529 | Hartwig | Dec. 28, 1937 |
| 2,213,956 | Drake | Sept. 10, 1940 |
| 2,214,558 | Kronmiller | Sept. 10, 1940 |
| 2,267,775 | Wetzel | Dec. 30, 1941 |
| 2,285,204 | Hall et al. | June 2, 1942 |
| 2,301,708 | Roessler | Nov. 10, 1942 |
| 2,317,640 | Ray | Apr. 27, 1943 |
| 2,335,212 | Landon | Nov. 23, 1943 |
| 2,368,893 | Spangenberg et al. | Feb. 6, 1945 |
| 2,604,496 | Hunter | July 22, 1952 |

OTHER REFERENCES

Control Engineer's Handbook, Truxal, 1958 V (pages 8–10), McGraw-Hill Book Co., Inc., New York, N.Y.